United States Patent
Means et al.

(10) Patent No.: US 11,671,333 B2
(45) Date of Patent: *Jun. 6, 2023

(54) SYSTEMS AND METHODS FOR SUPPORTING CONNECTIVITY TO MULTIPLE VRFS FROM A DATA LINK

(71) Applicant: AT&T Intellectual Property I, L.P., Atlanta, GA (US)

(72) Inventors: Israel Means, Chula Vista, CA (US); Praveen Ramadenu, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,710

(22) Filed: Jun. 16, 2022

(65) Prior Publication Data

US 2022/0311679 A1  Sep. 29, 2022

Related U.S. Application Data

(63) Continuation of application No. 16/030,548, filed on Jul. 9, 2018, now Pat. No. 11,463,324.

(51) Int. Cl.
*H04L 45/586* (2022.01)
*H04L 41/00* (2022.01)
*H04L 45/24* (2022.01)

(52) U.S. Cl.
CPC ............ *H04L 41/20* (2013.01); *H04L 45/245* (2013.01); *H04L 45/586* (2013.01)

(58) Field of Classification Search
CPC ..... H04L 41/20; H04L 45/245; H04L 45/586; H04L 41/0813; H04L 41/0895; H04L 45/02

See application file for complete search history.

(56) References Cited

U.S. PATENT DOCUMENTS

| | | |
|---|---|---|
| 7,411,955 B2 | 8/2008 | Li et al. |
| 7,564,802 B2 | 7/2009 | Andrapalliyal et al. |
| 7,626,984 B2 | 12/2009 | Napierala |
| 7,742,477 B1 | 6/2010 | Guichard et al. |
| 7,751,405 B1 | 7/2010 | Kompella |
| 7,796,607 B2 | 9/2010 | Gerber et al. |
| 8,451,837 B1 | 5/2013 | Schuett et al. |
| 8,488,491 B2 | 7/2013 | Moreno et al. |
| 8,929,364 B2 | 1/2015 | Anumala et al. |
| 8,953,599 B1 | 2/2015 | Barth et al. |
| 8,995,446 B2 | 3/2015 | Patel et al. |
| 9,019,962 B1 | 4/2015 | Ghosh |
| 9,197,426 B2 | 11/2015 | Venkataswami et al. |

(Continued)

FOREIGN PATENT DOCUMENTS

WO   2016119724 A1   8/2016

OTHER PUBLICATIONS

Cisco, "Multi-VRF Support", MPLS: Layer 3 VPNs Configuration Guide, Cisco IOS Release, 2014, 18 pages.

*Primary Examiner* — Lesa M Kennedy
(74) *Attorney, Agent, or Firm* — Gutin & Gust, PLC; Mark Wilinski

(57) ABSTRACT

A system and method for software defined network (SDN) management. Route information is received from a customer edge (CE) device. The route information is parsed to identify at least one virtual routing and forwarding (VRF) instance for which the route information is intended. The route information is imported into the VRF instance.

20 Claims, 4 Drawing Sheets

(56) References Cited

U.S. PATENT DOCUMENTS

| | | |
|---|---|---|
| 9,294,393 B1 | 3/2016 | Mullooly et al. |
| 9,407,544 B1 | 8/2016 | Maino et al. |
| 9,426,069 B2 | 8/2016 | Copeland |
| 9,467,423 B2 | 10/2016 | Gu et al. |
| 9,787,546 B2 | 10/2017 | Bardgett et al. |
| 9,860,169 B1 | 1/2018 | Ninan et al. |
| 9,948,552 B2 | 4/2018 | Teng et al. |
| 2005/0188106 A1 | 8/2005 | Pirbhai et al. |
| 2008/0298374 A1 | 12/2008 | Rhoades et al. |
| 2010/0027549 A1 | 2/2010 | Satterlee et al. |
| 2010/0329252 A1 | 12/2010 | Mulamalla et al. |
| 2013/0114607 A1 | 5/2013 | Mcgovern |
| 2016/0112307 A1 | 4/2016 | Shen |
| 2017/0195210 A1 | 7/2017 | Jacob et al. |
| 2017/0288948 A1 | 10/2017 | Singh et al. |
| 2019/0028381 A1 | 1/2019 | Li et al. |

SYSTEMS AND METHODS FOR SUPPORTING CONNECTIVITY TO MULTIPLE VRFS FROM A DATA LINK

CROSS REFERENCE TO RELATED APPLICATIONS

This application is a continuation of U.S. patent application Ser. No. 16/030,548 filed on Jul. 9, 2018. All sections of the aforementioned application are incorporated herein by reference in their entirety.

TECHNICAL FIELD

This disclosure relates generally to network management and, more specifically, to management of virtual private networks (VPNs).

BACKGROUND

Telecommunication networks have migrated from using specialized networking equipment executing on dedicated hardware, like routers, firewalls, application specific servers, and gateways, to reconfigurable networks, such as software defined networks (SDNs), executing as virtualized network functions. Network providers increasingly use SDNs to provide customers with virtual private networks (VPN). Often, a single customer will have multiple VPN that the network provider will have to maintain for the customer. In order to implement multiple VPNs, network providers maintain virtual routing and forwarding (VRF) instances for each VPN. VRF instances allow physical routing devices to be segmented such that multiple virtual instances of a routing table can exist within a router simultaneously. This allows a routing device to provide routing functionality for multiple VPNs, thereby maximizing the use of network resources. For a virtualized network to function efficiency, it is important that the hardware resources of its underlying cloud infrastructure be managed efficiently.

A problem exists, however, in that the continued adoption of SDN will drive an increase in dynamic network onboarding at all network levels. This means that VRF instantiation must be dynamic to meet demand for instant on-demand reachability. Current methods have limitations in that they will not be able to meet the scale and complexity requirements necessitated by the increase in demand Therefore, what is needed are systems and methods for supporting connectivity to multiple VRFs from a data link.

SUMMARY

In one example, a system is provided. The system includes a processor, an input/output device coupled to the processor, and a memory coupled with the processor, the memory comprising executable instructions that when executed by the processor cause the processor to effectuate operations. Route information is received from a customer edge (CE) device. The route information is parsed to identify at least one virtual routing and forwarding (VRF) instance for which the route information is intended. The route information is imported into the VRF instance.

In one embodiment, first route information identifying a first VRF instance is identified and second route information identifying a second VRF instance is identified. In one embodiment, the first route information is imported into the first VRF instance and the second route information is imported into the second VRF instance. In one embodiment receiving occurs over a single data link communication session. In one embodiment, the single data link communication session is an eBGP session. In one embodiment, third route information is identified; it is determined that the third route information does not correspond to a VRF instance; and the third route information is dropped. In one embodiment, the route information includes at least one route defining a relationship between at least one node of a customer network and a virtual private network (VPN) operating on a provider network. In one embodiment, the route information includes a community value corresponding to the VPN.

In one example, a method is provided. Route information is received from a customer edge (CE) device. The route information is parsed to identify at least one virtual routing and forwarding (VRF) instance for which the route information is intended. The route information is imported into the VRF instance.

In one embodiment, first route information identifying a first VRF instance is identified and second route information identifying a second VRF instance is identified. In one embodiment, the first route information is imported into the first VRF instance and the second route information is imported into the second VRF instance. In one embodiment receiving occurs over a single data link communication session. In one embodiment, the single data link communication session is an eBGP session. In one embodiment, third route information is identified; it is determined that the third route information does not correspond to a VRF instance; and the third route information is dropped. In one embodiment, the route information includes at least one route defining a relationship between at least one node of a customer network and a virtual private network (VPN) operating on a provider network. In one embodiment, the route information includes a community value corresponding to the VPN.

In one embodiment, a method is provided. At least one association between a community value and a VRF instance is defined on a provider edge (PE) device. Route information is received, over an eBGP communication session, from a customer edge (CE) device. The route information is parsed to identify the community value. The association is used to identify the VRF instance. The route information is imported to the VRF instance.

In one embodiment, a first association is defined on the PE device between a first community value and a first VRF instance. A second association is defined on the PE between a second community value and a second VRF instance. In one embodiment, the first community value and the second community value are identified. In one embodiment, the route information is imported to the first VRF instance and the second VRF instance.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 1B is a representation of exemplary PE equipment that may be used in

FIG. 1.

DETAILED DESCRIPTION

Figure 1A:
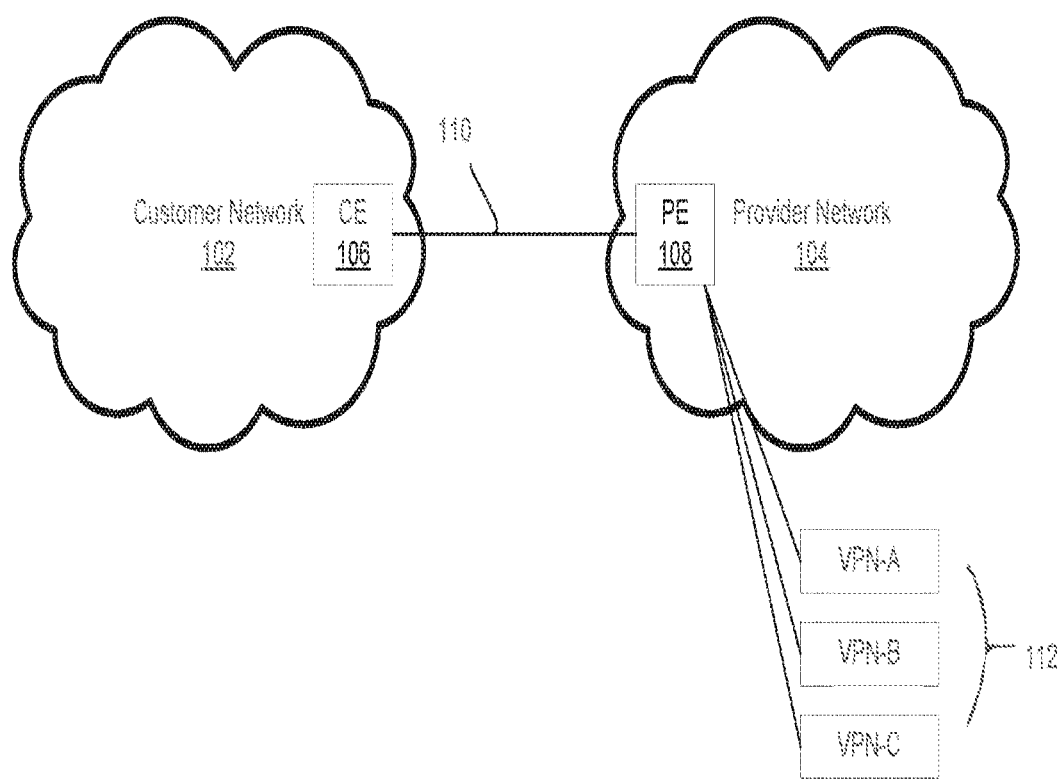
FIG. 1A is a representation of an exemplary system including a provider network with provider edge (PE) equipment and a customer network with customer edge (CE) equipment.

FIG. 1A represents an exemplary system 10. System 10 in one example comprises a customer network 102 and a provider network 104. It should be noted that a single customer network 102 and a single provider network 104 are depicted for illustrative purposes in order to simplify the description provided herein. However, the principles described herein are applicable to one or more customer networks 102 that are connected to one or more provider networks 104.

Customer networks 102 are formed from a plurality of interconnected nodes or devices. The customer networks 102 may be located on one or more physical sites. The sites of customer network 102 include one or more customer edge (CE) devices 106 that connect to one or more provider edge (PE) devices 108 of provider network 104. CE devices 106 and PE devices 108 are situated at the logical outer edge of their respective networks and allow customer networks 102 and provider networks 104 to interconnect. Accordingly, one or more CE devices 106 at a customer site may be connected to one or more PE devices 108 in provider network 104. In one example, CE devices 106 and PE devices 108 communicate to each other through one or more data links 110. The data links 110 may be established over various physical media, such as conventional wire links, optical links, wireless links, etc., and may communicate data formatted using various network communication protocols including ATM, Frame Relay, Ethernet, Fibre Distributed Data Interface (FDDI), etc. In one embodiment, data link 110 is one or more border gateway protocol BGP) communication sessions. In one embodiment, data link 110 is a single BGP communication session.

The sites of customer networks 102 may participate in one or more virtual private networks (VPNs) 112 which are maintained by provider network 104. To simplify, FIG. 1 depicts three VPNs 112, VPN-A, and VPN-C. It should be understood however, that fewer or more VPNs 112 may be maintained by provider network 104. In one example, VPNs 112 are a collection of nodes on customer network 102 that establish private communications over a provider network 104. The VPNs 112 in one example are implemented as virtual networks that are defined by logical end to end paths between the nodes of the customer network 102 through the nodes of the provider network 104. Therefore, although provider networks 104 may not be private per se, the logical paths maintained by provider network 104 allow provider network 104 to provide one or more virtualized private networks (VPNs 112) to customers.

Figure 1B:
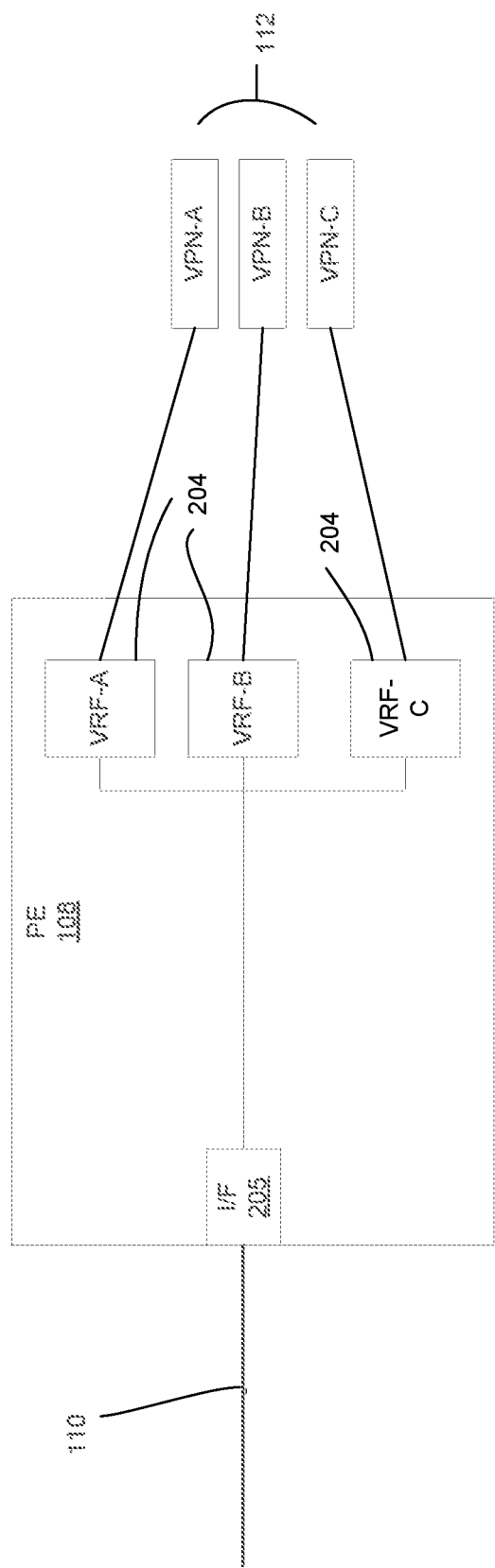

Referring to FIG. 1B, in one example, the implementation of VPNs 112 involves PE devices 108 maintaining one or more VRFs 204, which correspond to the one or more VPNs 112. A VRF 204 in one example is software and/or data functionality that enables the VRF 204 to act as a virtual router for the corresponding VPN 112. Therefore, routes defined by VRF-A allow the nodes defined in VRF-A to participate in VPN-A. Similarly, routes defined by VRF-B allow the nodes defined in VRF-B to participate in VPN-B, and so forth. It should be noted that node(s) in a customer network 102 may belong to multiple VPNs 112.

Referring further to FIG. 1B, PE device 104 in one embodiment includes interface logic 205. Interface logic 205 in one example is a termination point for data link 110 from CE device 106. In one embodiment, interface logic 205 included functionality to parse routes broadcast over data link to determine which VRFs 204 to include the route within.

Figure 2:
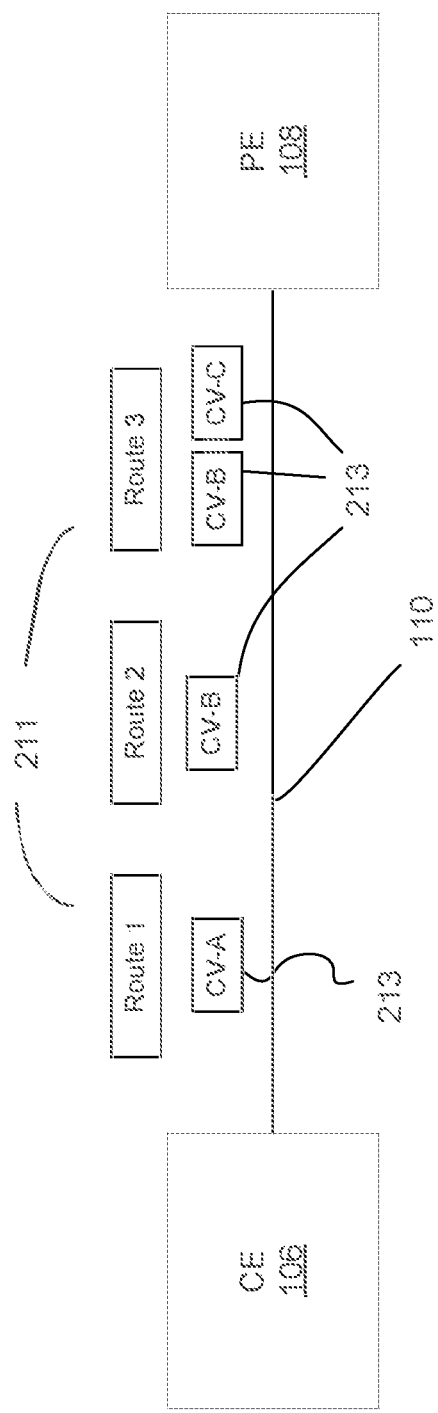
FIG. 2 is a functional representation of communication between PE equipment and CE equipment.

Referring to FIG. 2, a functional description of an exemplary method by which interface logic 205 operates will now be provided for illustrative purposes. In FIG. 2, CE device 106 announces one or more routes 211 to PE device 108. Routes 211 for exemplary purposes are shown as "Route 1", "Route 2", and "Route 3" although it should be understood that fewer or more routes are encompassed by the present disclosure. When announcing routes 211, CE device 106 will tag the route 211 with a community value 213. The community value 213 in one example corresponds to one or more VRFs 204 and thus one or more VPNs 112. In the example shown, CV-A corresponds to VRF-A, CV-B corresponds to VRF-B, and so forth. In one example, the CV values are defined by the provider when onboarding a customer to provider network 104.

Accordingly, should customer network 102 wish to provide one or more nodes, which correspond to Route 1, with access to VPN-A, CE 106 would append CV-A to Route 1 and send it over data link 110 to PE device 108. Should customer network 102 wish to provide one or more nodes, which correspond to Route 2 to VPN-B, CE 106 would append CV-B to Route 2 and send it over data link 110 to PE device 108, and so forth. It should also be noted that, in one example, customer network 102 may want to grant one or more nodes access to multiple VPNs 112. For instance, if customer network 102 wanted to provide one or more nodes, corresponding to Route 3, with access to VPN-B and VPN-C, then CE device 106 would append CV-B and CV-C to Route 3 and send it over data link 110 to PE device 108.

Referring further to FIG. 1B and FIG. 2, interface logic 205 parses the routes 211 that it receives over data link 110 and identifies the CVs 213 that are tagged onto the routes. The PE device 108 can then import the routes 211 to the appropriate VRFs 204. Accordingly, interface logic 205 and the above described processes allow for the dynamic relationship of routes to multiple VRFs 204 and correspondingly formation and updating of VPNs 112 from a single communication session, such as a PE-CE eBGP session.

In one example, if a route 211 arrives with a CV 213 that is not assigned to a customer or does not match a VRF 204 associated with a customer, then the route 211 may be dropped. In one example, the data link 110 is a single eBGP session. The eBGP session is assigned to a novel VRF structure, which is called an interface-VRF (Int-VRF). The int-VRF prevents routes from flowing into global tables, thus preserving the closed routing paradigm. Each VRF may be assigned to one or more Int-VRFs and all routes learned by a VRF 204 are announced to the Int-VRF for export to the CE device 106. Accordingly, the Int-VRF may emulate a direct logical relationship between the PE-CE BGP session and the VRF 204.

Figure 3:
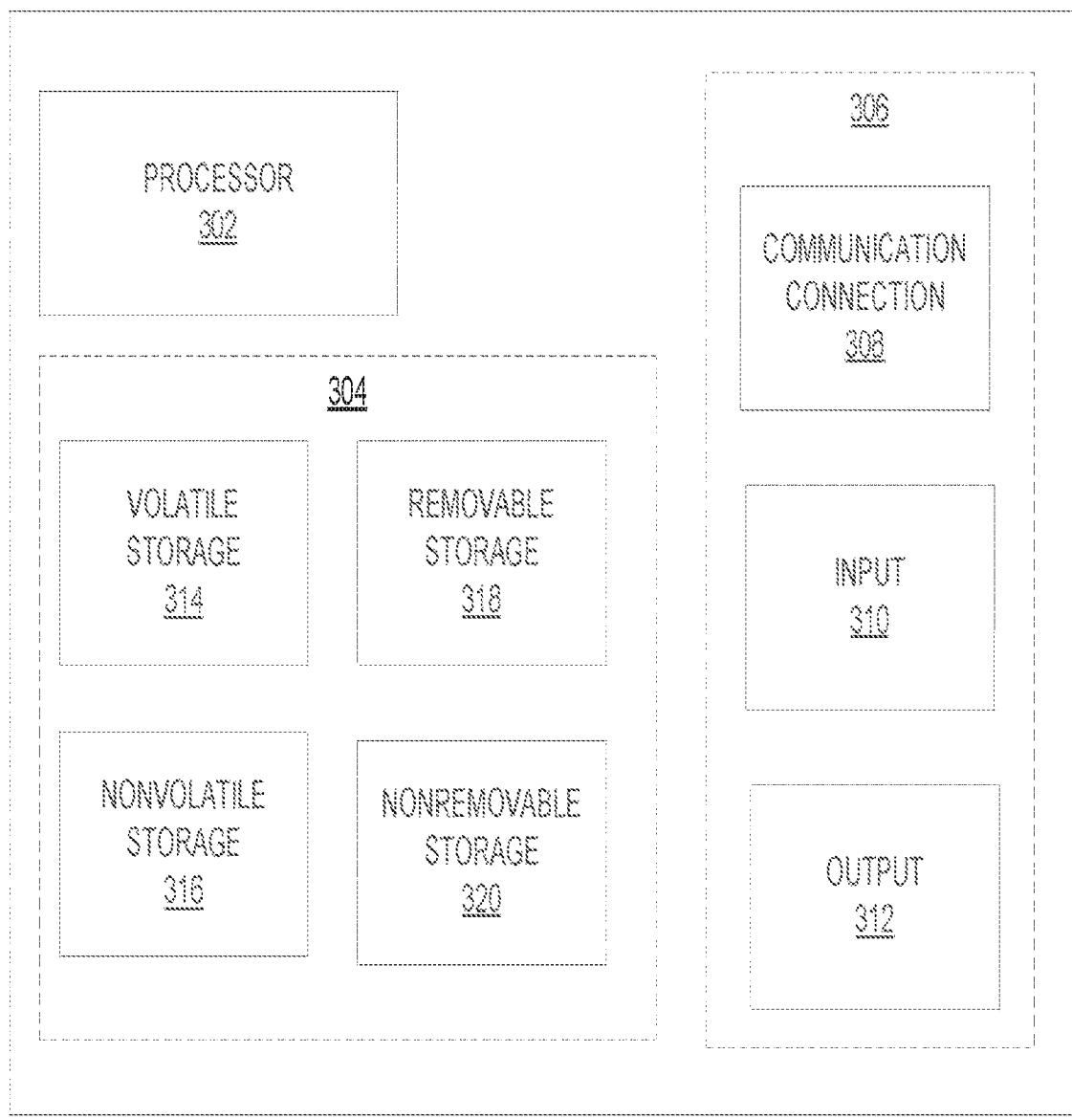
FIG. 3 is a representation of an exemplary network device that may be used in the system of FIG. 1.

Referring to FIG. 3, all or parts of system 10 may be implemented on a network device, an example of which is illustrated in FIG. 3 as a functional block diagram. Network device 300 may comprise a processor 302 and a memory 304 coupled to processor 302. Memory 304 may contain executable instructions that, when executed by processor 302, cause processor 302 to effectuate operations associated with translating parallel protocols between end points in families as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

While examples of systems and methods for management of virtualized devices have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

The invention claimed is:

1. A device comprising:
    a processor; and
    a memory coupled to the processor, the memory comprising executable instructions that when executed by the processor cause the processor to effectuate operations comprising:
        receiving route information from a customer edge (CE) device of a customer network, wherein the route information includes a first community value (CV) corresponding to a first route and a first virtual private network (VPN) and a second CV corresponding to a second route and a second VPN, wherein the first route is different from the second route and the first VPN is different from the second VPN, and wherein the customer network includes a first node and a second node;
        parsing the route information to identify the first CV and the second CV;
        based on the parsing, importing the first route to a first virtual routing and forwarding (VRF) instance to provide the first node with access to the first VPN; and
        based on the parsing, importing the second route to a second VRF instance to provide the first node and the second node with access to the second VPN, the second VRF instance different from the first VRF instance.

2. The device of claim 1, wherein the operations further comprise:
    identifying first route information of the route information, the first route information identifying the first VRF instance; and
    identifying second route information of the route information, the second route information identifying the second VRF instance.

3. The device of claim 2, wherein the operations further comprise:
    identifying third route information of the route information;
    determining that the third route information does not correspond to one of a multiple VRF instances that includes the first VRF instance and the second VRF instance; and
    dropping the third route information based on the determining that the third route information does not correspond to one of the multiple VRF instances.

4. The device of claim 1, wherein the receiving occurs over a single External Border Gateway Protocol (eBGP) session.

5. The device of claim 1, wherein the route information includes at least one route defining a relationship between at least a third node of the customer network and a third VPN.

6. The device of claim 5, wherein the route information includes a third CV corresponding to the third VPN.

7. The device of claim 5, wherein the third VPN operates on a provider network that is different from the customer network.

8. A method comprising:
    receiving, by a processor, route information from a customer edge (CE) device of a customer network, wherein the route information includes a first community value (CV) corresponding to a first route and a first virtual private network (VPN) and a second CV corresponding to a second route and a second VPN, wherein the first route is different from the second route and the first VPN is different from the second VPN, and wherein the customer network includes a first node and a second node;
    importing, by the processor, the first route to a first virtual routing and forwarding (VRF) instance to provide the first node with access to the first VPN; and
    importing, by the processor, the second route to a second VRF instance to provide the first node and the second node with access to the second VPN, wherein the second VRF instance is different from the first VRF instance,
    wherein the first route imported by the first VRF instance is announced to an interface-VRF for export to the CE device.

9. The method of claim 8, wherein the CE device tags the first route with the first CV.

10. The method of claim 8, further comprising:
    identifying, by the processor, first route information of the route information, the first route information identifying the first VRF instance; and
    identifying, by the processor, second route information of the route information, the second route information identifying the second VRF instance.

11. The method of claim 10, further comprising:
    identifying, by the processor, third route information of the route information;
    determining, by the processor, that the third route information does not correspond to a VRF instance; and
    dropping, by the processor, the third route information based on the determining that the third route information does not correspond to a VRF instance.

12. The method of claim 8, wherein the receiving of the route information occurs over a single data link.

13. The method of claim 12, wherein the single data link is an optical link.

14. The method of claim 12, wherein the single data link is a wireless link.

15. The method of claim 8, wherein the route information includes at least one route defining a relationship between a third node of the customer network and a third VPN operating on a provider network.

16. The method of claim 15, wherein the route information includes a third CV corresponding to the third VPN and a third route.

17. A tangible computer-readable storage medium comprising instructions that, when executed by a processor, facilitate a performance of operations, the operations comprising:
    receiving route information from a customer network, wherein the route information includes a first community value (CV) corresponding to a first route and a first virtual private network (VPN) and a second CV corresponding to a second route and a second VPN, wherein the first route is different from the second route and the first VPN is different from the second VPN, and wherein the customer network includes a first node and a second node;
    parsing the route information to identify the first CV and the second CV;
    based on the parsing, associating the first CV with a first virtual routing and forwarding (VRF) instance to provide the first node with access to the first VPN via the first route; and
    based on the parsing, associating the second CV with a second VRF instance to provide the first node and the second node with access to the second VPN via the second route.

18. The tangible computer-readable storage medium of claim 17, wherein the receiving of the route information comprises receiving the route information from a customer edge (CE) device of the customer network.

19. The tangible computer-readable storage medium of claim 17, wherein the associating of the first CV with the first VRF instance comprises importing the first route to the first VRF instance.

20. The tangible computer-readable storage medium claim 17, wherein the operations further comprise:
  based on the parsing, associating the second CV with a third VRF instance to provide a third node of the customer network with access to the second VPN via the second route.

* * * * *